US007292189B2

(12) United States Patent
Orr et al.

(10) Patent No.: US 7,292,189 B2
(45) Date of Patent: Nov. 6, 2007

(54) METHODS AND APPARATUS FOR HIGH RESOLUTION POSITIONING

(75) Inventors: John A. Orr, Holden, MA (US); William R. Michalson, Charlton, MA (US); David Cyganski, Holden, MA (US); R. James Duckworth, Shrewsbury, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 192 days.

(21) Appl. No.: 11/223,079

(22) Filed: Sep. 8, 2005

(65) Prior Publication Data
US 2006/0244661 A1    Nov. 2, 2006

Related U.S. Application Data

(60) Provisional application No. 60/608,651, filed on Sep. 10, 2004, provisional application No. 60/608,593, filed on Sep. 10, 2004.

(51) Int. Cl.
*G01S 3/02* (2006.01)
(52) U.S. Cl. .................................. 342/465; 342/387
(58) Field of Classification Search ............. 342/387, 342/453, 463, 465; 455/41.2–41.3
See application file for complete search history.

(56) References Cited

U.S. PATENT DOCUMENTS

| | | | |
|---|---|---|---|
| 5,317,323 A | 5/1994 | Kennedy et al. | |
| 5,327,144 A | 7/1994 | Stilp et al. | |
| 5,589,838 A | 12/1996 | McEwan | |
| 5,613,205 A | 3/1997 | Dufour | |
| 5,615,409 A | 3/1997 | Forssen et al. | |
| 5,708,443 A | 1/1998 | Rose | |
| 5,952,969 A | 9/1999 | Hagerman et al. | |
| 6,006,097 A | 12/1999 | Hornfeldt et al. | |
| 6,031,490 A | 2/2000 | Forssen et al. | |
| 6,091,362 A | 7/2000 | Stilp et al. | |
| 6,097,336 A | 8/2000 | Stilp | |
| 6,115,599 A | 9/2000 | Stilp | |
| 6,172,644 B1 | 1/2001 | Stilp | |

(Continued)

OTHER PUBLICATIONS

R.J. Fontana, Experimental Results From An Ultra Wideband Precision Geolocation System. Proceedings of the Ultra-wideband, Short-Pulse Electromagnetics 5, Conference, p. 215-223, 2000.*

(Continued)

*Primary Examiner*—Thomas H. Tarcza
*Assistant Examiner*—Fred H. Mull
(74) *Attorney, Agent, or Firm*—Ropes & Gray LLP

(57) ABSTRACT

The invention relates to a method of signal analysis that determines the location of a transmitter and to devices that implement the method. The method includes receiving by at least three receivers, from a transmitter, a first continuous-time signal having a first channel. The first channel includes a first plurality of signal carriers having known relative initial phases and having known frequencies which are periodically spaced and which are orthogonal to one another within a first frequency range. The signal analysis method also includes determining the phase shifts of the carriers of the first channel resulting from the distance the carriers traveled in reaching the first receiver. Analysis of the phase shifts yields time difference of arrival information amongst the receivers, which is further processed to determine the location of the transmitter.

53 Claims, 7 Drawing Sheets

U.S. PATENT DOCUMENTS

| | | | |
|---|---|---|---|
| 6,173,231 | B1 | 1/2001 | Chojnacki |
| 6,184,829 | B1 | 2/2001 | Stilp |
| 6,185,428 | B1 | 2/2001 | Kingdon et al. |
| 6,236,365 | B1 | 5/2001 | LeBlanc et al. |
| 6,249,252 | B1 | 6/2001 | Dupray |
| 6,253,146 | B1 | 6/2001 | Hanson et al. |
| 6,266,013 | B1 | 7/2001 | Stilp et al. |
| 6,278,939 | B1 | 8/2001 | Robare et al. |
| 6,281,834 | B1 | 8/2001 | Stilp |
| 6,285,321 | B1 | 9/2001 | Stilp et al. |
| 6,292,745 | B1 | 9/2001 | Robare et al. |
| 6,314,365 | B1 | 11/2001 | Smith |
| 6,317,081 | B1 | 11/2001 | Stilp |
| 6,317,604 | B1 | 11/2001 | Kovach, Jr. et al. |
| 6,334,059 | B1 | 12/2001 | Stilp et al. |
| 6,351,235 | B1 | 2/2002 | Stilp |
| 6,366,241 | B2 | 4/2002 | Pack et al. |
| 6,388,618 | B1 | 5/2002 | Stilp et al. |
| 6,400,320 | B1 | 6/2002 | Stilp et al. |
| 6,463,290 | B1 | 10/2002 | Stilp et al. |
| 6,483,460 | B2 | 11/2002 | Stilp et al. |
| 6,492,944 | B1 | 12/2002 | Stilp |
| 6,519,465 | B2 | 2/2003 | Stilp et al. |
| 6,563,460 | B2 | 5/2003 | Stilp et al. |
| 6,587,782 | B1 | 7/2003 | Nocek et al. |
| 6,603,428 | B2 | 8/2003 | Stilp |
| 6,603,977 | B1 | 8/2003 | Walsh et al. |
| 6,640,106 | B2 | 10/2003 | Gutowski et al. |
| 6,646,604 | B2 | 11/2003 | Anderson |
| 6,661,379 | B2 | 12/2003 | Stilp et al. |
| 6,725,156 | B2 | 4/2004 | Kaplan |
| 6,747,556 | B2 | 6/2004 | Medema et al. |
| 6,765,531 | B2 | 7/2004 | Anderson |
| 6,768,910 | B2 | 7/2004 | Gutowski et al. |
| 6,771,625 | B1 | 8/2004 | Beal |
| 6,782,264 | B2 | 8/2004 | Anderson |
| 6,850,837 | B2 | 2/2005 | Paulauskas et al. |
| 6,873,290 | B2 | 3/2005 | Anderson et al. |
| 6,876,859 | B2 | 4/2005 | Anderson et al. |
| 7,132,981 | B1 * | 11/2006 | Roberts ............... 342/464 |
| 2001/0011954 | A1 | 8/2001 | Shelton et al. |
| 2004/0070498 | A1 * | 4/2004 | Michalson ............ 340/539.13 |
| 2004/0233858 | A1 * | 11/2004 | Karaoguz ............... 370/254 |

OTHER PUBLICATIONS

Belanger, Scott P. An EM Algorithm for Multisensor TDOA/DD Estimation in a Multipath Propagation Environment. IEEE International Conference Proceedings, ICASSP-96. 6:3117-20 (1996).

Bonek et al. Double-directional Radio Channel Measurements—What We Can Derive from Them. Proc. ISSSE 01, International Symposium on Signals, Systems, and Electronics. (2001).

Bonek et al. Double-directional Superresolution Radio Channel Measurements. Proc. 39th Annual Allerton Conference on Communication, Control, and Computing. (2001).

Capkun et al. GPS-free positioning in mobile ad hoc networks. Proc. of 34th Annual Hawaii International Conference on System Sciences (HICSS-34). 9:9, 1-15 (2001).

Cong et al. Non-Line-of-Sight Error Mitigation in TDOA Mobile Location. Proc. IEEE Globecom. pp. 680-684 (2001).

DiClaudio et al. A Clustering Approach to Multi-Source Localization in Reverberant Rooms. Proceedings of the 2000 IEEE Sensor Array and Multichannel Signal Processing Workshop. pp. 198-201 (2000).

Haardt et al. Efficient High-Resolution 3-D Channel Sounding. 48th IEEE Vehicular Technology Conference. 1, 164-68 (1998).

Haneda et al. Double Directional Ultra Wideband Channel Characterization in a Line-of-Sight Home Environment. 11th Management Committee Meeting, COST 273 (2004).

Haneda et al. High-Resolution Estimation of NLOS Indoor MIMO Channel with Network Analyzer Based System. 14th IEEE International Symposium on Personal, Indoor and Mobile Radio Communication Proceedings. pp. 675-679 (2003).

Hill et al. Techniques for Reducing the Near-Far Problem in Indoor Geolocation Systems Institute of Navigation, National Technical Meeting. pp. 860-865 (2001).

Hirschler-Marchand et al. Superresolution Techniques in Time of Arrival Estimation for Precise Geolocation. Proc. IEEE, pp. 1272-1277 (2002).

Hirt et al. WWRF/WG4/UBW-Subgroup, White Paper. Pervasive Ultra-wideband Low Spectral Energy Radio Systems (PULSERS). pp. 1-28 (2002).

Jiang et al. Path Models and MIMO Capacity for Measured Indoor Channels at 5.8 GHz. IEEE 9th International Symposium on Antenna Technology and Applied Electromagnetics. (2002).

Kalliola et al. 3-D Double Directional Radio Channel Characterization for Urban Macrocellular Applications. IEEE Transactions on Antennas and Propagation. 51:11, 3122-33 (2003).

Kambayashi et al. Mobile Terminal Positioning Using Data Symbols to Mitigate the Influence of Noise in Multi Carrier Modulation. 16th Communication Systems Workshop (CSWS). (2003).

Li, Xinrong et al. Comparison of Indoor Geolocation Methods in DSSS and OFDM Wireless LAN Systems. IEEE Veh. Technol. Conference. 6:52ND, 3015-20 (2000).

Li, Xinrong et al. Indoor Geolocation Using OFDM Signals in HIPERLAN/2 Wireless LANs. 11th IEEE International Symposium, Personal, Indoor and Mobile Radio Communications. 2:1449-53 (2000).

Li, Xinrong. Super-Resolution TOA Estimation with Diversity Techniques for Indoor Geolocation Applications. Dissertation submitted to Worcester Polytechnic Institute Faculty. Apr. 2003.

Nerguizian et al. A Framework for Indoor Geolocation using an Intelligent System. INRS-Telecommunications, 3rd WLAN Workshop. (2001).

Richter et al. Joint Estimation of DoD, Time-Delay, and DoA for High-Resolution Channel Sounding. IEEE Proceedings, Vehicular Technology Conference. 2, 1045-49 (2000).

Ying et al. Location Parameters Estimation in Mobile Communication Systems. Int'l. Cnf. on Communication Technology. 1, 261-68 (2000).

* cited by examiner

METHODS AND APPARATUS FOR HIGH RESOLUTION POSITIONING

CROSS-REFERENCE TO RELATED APPLICATIONS

This application incorporates by reference in entirety, and claims priority to and benefit of, U.S. Provisional Patent Application No. 60/608,651, entitled "Methods and Apparatus for Multi-Carrier Ultrawideband Location" and filed on Sep. 10, 2004; and U.S. Provisional Patent Application No. 60/608,593, entitled "Methods and Apparatus for Multi-Carrier Ultrawideband Location and Communication" and filed on Sep. 10, 2004.

GOVERNMENT CONTRACT

The U.S. Government has a paid-up license in this invention and the right in limited circumstances to require the patent owner to license others on reasonable terms as provided for by the terms of Contract No. 2003-IJ-CX-K025 awarded by the United States Department of Justice.

FIELD OF THE INVENTION

In general, the invention relates to methods and apparatus for high resolution positioning. More particularly, the invention relates to methods and apparatus for high resolution positioning using signals composed of channels of periodic, orthogonal carriers.

BACKGROUND OF THE INVENTION

Military, civilian and commercial entities have all recognized the need for precise positioning technology. The military seeks to be able to locate and track soldiers or vehicles as they progress across the battlefield. Civilian government entities want to locate fire fighters, for example, in burning buildings. The market for commercial navigation services using, for example, global positioning system (GPS) technology has grown significantly.

Traditional positioning technologies have suffered in high multi-path environments. Traditional approaches include, for example, GPS, and impulse ultrawideband signaling. GPS fails to provide accurate results in high multipath environments, and its low signal strength makes the signal vulnerable to jamming. Impulse ultrawideband technology suffers from the fact that it is fundamentally ultra-wideband and hence cannot be confined to previously unallocated bands of the spectrum ("spectrum"). Thus, it can only be used at relatively low power levels so as not to interfere with communications within bands of the spectrum allocated by the government for use by other services. Impulse ultrawideband signaling also suffers from long acquisition times and ease of interception.

SUMMARY OF THE INVENTION

The use of a continuous multi-carrier ultrawideband (MCUWB) signal can provide both accurate positioning capabilities as well as provide for data communication in high multipath environments. MCUWB signaling creates little to no interference with other data communication as each component of a MCUWB signal is very narrow band and can be interleaved easily with existing allocations. Therefore it need not be restricted to limited, unallocated, portions of the spectrum. The ability to operate across the spectrum also makes multi-carrier ultrawideband communications resistant to jamming. MCUWB signals can readily be encoded to provide a low possibility of signal detection and to provide a low probability of signal interception.

Utilizing the features of MCUWB signals, in one aspect, the invention relates to a method of signal analysis that yields the location of a transmitter, in some implementations, with a resolution on the order of 10 cm. The method includes receiving by at least three receivers, from a transmitter physically decoupled from the receivers, a first continuous-time signal having a first channel. The first continuous time signal may be a linear combination of signal components resulting from the first continuous time signal arriving at the receivers via a plurality of paths. The first channel includes a first plurality of signal carriers having known relative initial phases and having known frequencies, which are orthogonal to one another within a first frequency range. In some implementations, the carriers are also spaced periodically within the frequency range. The signal analysis method includes determining the phase shifts of the carriers of the first channel resulting from the distance the carriers traveled in reaching the first receiver. Analysis of the phase shifts yields time difference of arrival information amongst the receivers, which is further processed to determine the location of the transmitter. The method may also include identifying a most-direct path signal component (i.e., the signal component received by a receiver that arrived by a path that is shorter than the paths of the other signal components received by the receiver). This identification may be based at least in part on the determined phase shifts or on an evaluation of possible location solutions resulting from hypothesizing that various signal components are the most-direct path signal components.

In one embodiment, the location of the transmitter is determined, for example, by analyzing the determined phase shifts using modern spectral analysis, for example, with a state space algorithm. Use of a state space algorithm may include forming a matrix of the magnitudes and phases of the first plurality of carriers and performing a plurality of matrix decompositions upon the matrix.

A further feature of the method provides for the inclusion of additional channels in the first continuous-time signal. The additional channels each include a plurality of carriers having known relative initial phases and having known frequencies, which are orthogonal to one another, and which may also be periodically spaced, within distinct frequency ranges. Phase shift information derived from the additional channels may be used independently from, or in conjunction with, phase shift information derived from the first channel to determine the location of the transmitter.

The frequencies of the carriers in the channel(s) may be selected to lie between previously proscribed frequency bands allocated by the government, or the frequencies may overlap these bands. One or more channels of the continuous multi-carrier signal may be modulated with additional data. Alternatively, the channels may only include pure carrier sine waves. The signals, whether carrier sine waves or modulated with data, can further be encoded with an encoding scheme (e.g., pseudo-random noise modulation) to reduce the likelihood of the signals' detection, interception, and jamming. Additional features may include transmitter-receiver clock synchronization as well as receiver-receiver clock synchronization. The receiver-receiver clock synchronization can be a loose synchronization or a tight synchronization.

In another aspect, the invention relates to a transmitter location system that includes at least three receivers. The receivers have locations that are known relative to one another and receive a plurality of continuous-time multi-carrier signal components corresponding to a multi-carrier signal sent by a transmitter. The signal has at least one channel that includes a plurality of carriers which have known relative initial phases and which have frequencies which are orthogonal to other frequencies within that channel. In some implementations, the carriers within the channel are also spaced periodically over a distinct frequency range. The system includes a processor configured to determine the phase shifts in the carriers of at least one of the channels of the continuous multi-carrier signal components received at the receivers and to determine the location of the transmitter based at least in part on those phase shifts. The processor also is configured to select at least one of the plurality of continuous multi-carrier signal components received at each receiver as a most-direct path signal component based on the determined phase shifts.

In a third aspect, the invention relates to a locatable transmitter. The transmitter includes a signal store for storing one or more signal channels. Each channel includes a plurality of carriers having known relative initial phases and having frequencies orthogonal to other frequencies within that channel. The carriers in each channel may be spaced periodically over frequency ranges distinct to that channel. The transmitter also includes a plurality of oscillators to modulate the stored signal to a number of base band frequencies to generate a number of transmission channels. Alternatively, the transmitter includes software or dedicated hardware logic for algorithmically generating and modulating the signal channels. The transmitter also incorporates an amplifier for broadcasting a combination of the generated transmission signals.

Additional features included in various implementations include an encoder for encoding the transmission signals prior to transmission. The encoder may implement a coding scheme, such as pseudo-random noise modulation. The transmitter oscillators may also be controllable to oscillate at varying frequencies. In one implementation, the oscillators may be controlled to provide a frequency hopping feature.

In another aspect, the invention relates to an adaptive communications device that provides for transmitting both location and data communication information. The device includes a base band signal generator for generating a base band signal. The base band signal includes a first plurality of carriers having known relative initial phases and having known frequencies that are orthogonal to one another within a first frequency range. The carrier frequencies may also be periodically spaced within the first frequency range. The device also includes an oscillation module in communication with the base band signal generator for modulating the base band signal to generate a set of transmission channels. A data modulation controller is configured to select a subset of the transmission channels as data transmission channels. The device also includes a data modulator configured to modulate data into the selected data transmission channels. Such data may include, without limitation, vital signs; data describing the environmental conditions in which the transmitter is located, such as temperature, pressure, air quality, or gas levels; or synchronization data. The remaining channels can then be used for transmitting location information.

The device, in one embodiment, includes a feature to independently modulate each individual channel with different data. Another feature is the ability of the data modulation controller to dynamically select a number of data transmission signals based at least in part on instructions received from a receiver. Alternatively, the data modulation controller is configured to select a number of channels for data transmission based on the broadcast environment.

In a further aspect, the invention relates to an adaptive communications device that provides for reception of both location and data transmission signals. The device includes a demodulation module for demodulating a plurality of received channels. Each channel includes a plurality of carriers having known relative initial phases and having known frequencies that are and orthogonal to one another and which may be periodically spaced within a distinct frequency range.

The device also includes a signal analysis module. The signal analysis module is configured to determine a direct path signal from a transmitter to the communications device, determine the location of the transmitter, recover data modulated into at least one of the received channels, and provide requested data bandwidth instructions to the receiver. The device may also provide the determined location information back to the transmitter.

In still another aspect, the invention relates to a method of providing variable bandwidth data communication. The method includes generating a base band channel including a plurality of carriers having known relative initial phases and having known frequencies orthogonal to one another within a frequency range. The frequencies of the carriers may also be periodically spaced within the frequency range. The base band signal is modulated to a plurality of base frequencies to generate a set of transmission channels. The method also includes selecting a subset of the transmission channels for encoding data to form data transmission channels. The selected and unselected transmission channels are combined and broadcast to a plurality of receivers. The unselected transmission channels can be analyzed by the receivers to determine the location of the source of the broadcast.

BRIEF DESCRIPTION OF DRAWINGS

The system and methods may be better understood from the following illustrative description with reference to the following drawings in which.

DESCRIPTION OF CERTAIN ILLUSTRATIVE EMBODIMENTS

To provide an overall understanding of the invention, certain illustrative embodiments will now be described, including apparatus and methods for high resolution positioning. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Appropriate usage of a multi-carrier ultrawideband (MCUWB) signal can provide both accurate positioning capabilities as well as provide for data communication in high multipath environments.

Figure 1:
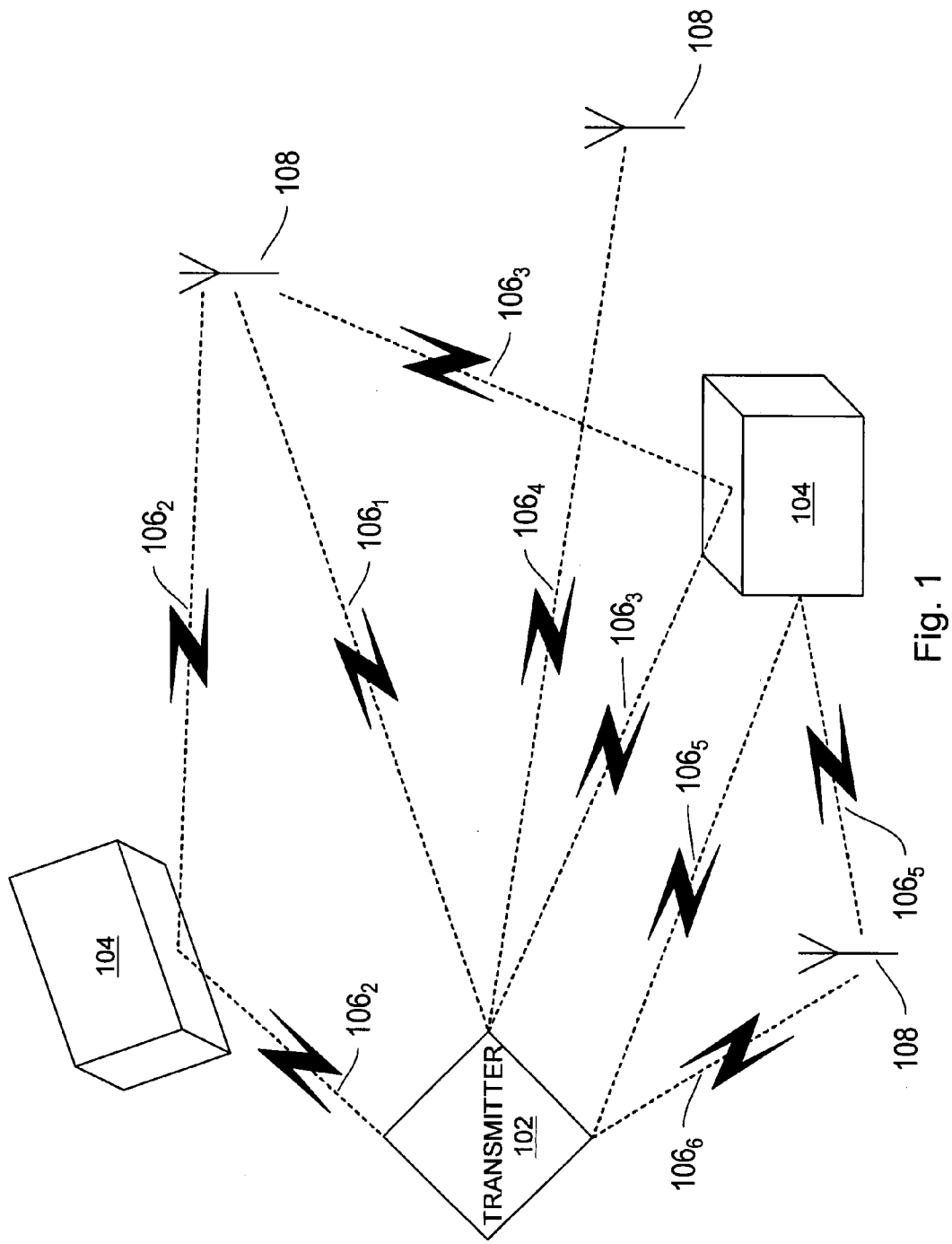
FIG. 1 is an illustrative high multipath environment in which multi-carrier ultrawideband positioning may be employed according to an illustrative embodiment of the invention.

FIG. 1 is an illustration of a high multi-path environment 100 in which MCUWB positioning and data communication technologies provide benefits over traditional technologies. The high multi-path environment 100, for example, may be a location within a large city or a location within a building. A physically decoupled transmitter 102 (i.e., a transmitter which is not connected by wire to a receiver) located amongst buildings 104 transmits a signal. Receivers 108 attempting to receive the transmitted signal receive a signal which is a linear combination of the signal traversing varying paths in reaching the receivers 108. Upon receipt, a signal arriving via a particular path is referred to individually as signal component $106_1 \ldots _N$ or collectively as signal 106. The linear combination may include a most-direct path signal component (e.g., $106_1$, $106_4$, and $106_6$) and/or one or more less-direct path signal components (e.g., $106_2$, $106_3$, and $106_5$) resulting from the reflection of the transmitted signal off of nearby buildings 104 or other surfaces. The most-direct single component path need not have arrived at the receiver 108 directly. The most-direct path signal component is the signal component of the received signal components that arrived by the most-direct path.

In order to perform accurate ranging, the receiver 108 analyzes the signal 106 to find the most-direct path signal component. A MCUWB signal is well suited for determining which path signal 106 is most direct, and for subsequent analysis of such signal. However, other continuous-time signals having periodic, orthogonal frequency carriers over a more narrow band may also yield satisfactory results.

Figure 2A:
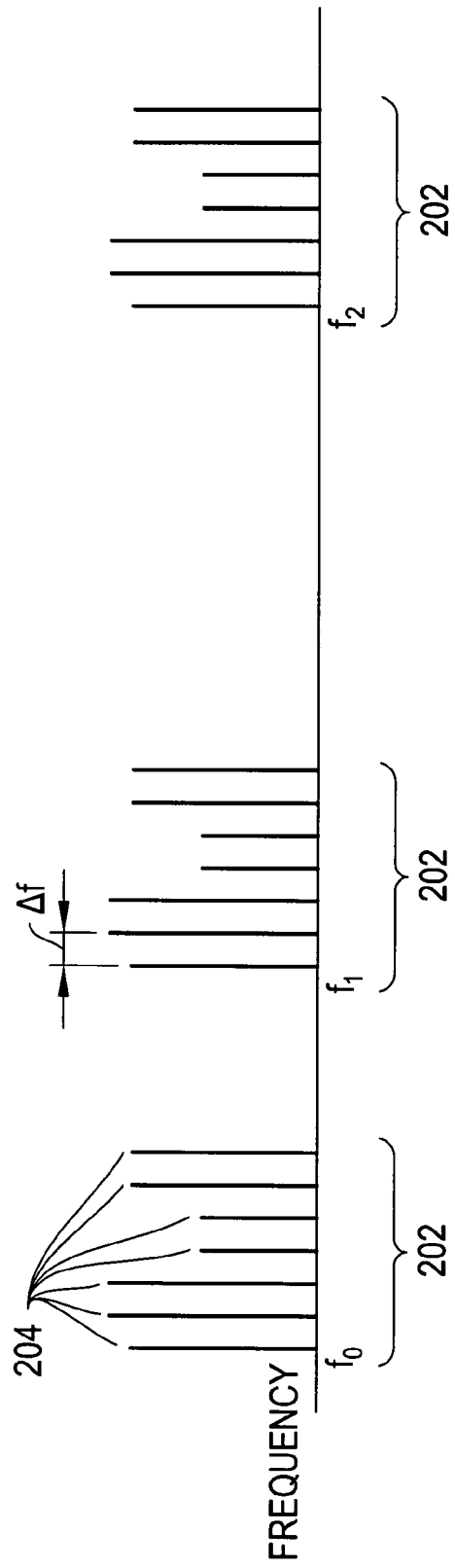
FIGS. 2A-2B are graphical depictions of illustrative multi-carrier ultrawideband signal structures, in the frequency domain, according to illustrative embodiments of the invention.

FIG. 2A is an illustrative frequency domain illustration of a MCUWB signal 200. In the frequency domain a MCUWB signal 200 includes one or more channels 202, s(t). Each channel 202 further includes a number M, of discrete frequency carriers 204. The carriers 204 are periodically and narrowly spaced (Δf) across a particular band of the spectrum, beginning at base frequency $f_0$. The frequencies of the carriers 204 within a given channel 202 are orthogonal to one another and have random or arbitrary, but known, phases $\phi_m$ and amplitudes A. Mathematically, a given channel 202 having M carriers can be represented by the following equation:

$$s(t) = \sum_{m=0}^{M-1} A_m e^{j[2\pi f_0 + m\Delta f)t + \phi_m]} \qquad (1)$$

The specific carrier structure of a given signal can operate as an identifier of the transmitter 102. In one embodiment each channel 202 is identical to the other channels other than its general location within the spectrum. For example, a first channel 202 is transmitted with a base frequency of $f_0$, a second channel 202 has a base frequency of $f_1$, and a third channel has a base frequency of $f_2$. Two base frequencies of interest include 440 MHZ and 2.4 GHz. Preferably, channels 202 do not overlap. In another implementation, the amplitude of carriers 204 within each channel 202, or of each channel 202 as a whole, is determined dynamically, at least in part based on knowledge of the given transmission environment. For example, power is directed to those channels 202 facing the least interference and the least selective fading. The amplitudes of the interfered with, or faded, channels 202 are minimized to avoid wasting energy.

In one implementation, the MCUWB signal includes a number of carrier sine waves transmitted at the carrier 204 frequencies. As the carriers 204 are not modulated with data, the frequencies can be located arbitrarily along the spectrum without interfering with other signal traffic. In other implementations, in which the carriers 204 are modulated with data, the channel 202 frequencies are selected to fall within gaps between government allocated bands of the spectrum. In some implementations, the carriers need not be spaced periodically, so long as they are orthogonal.

Figure 2B:
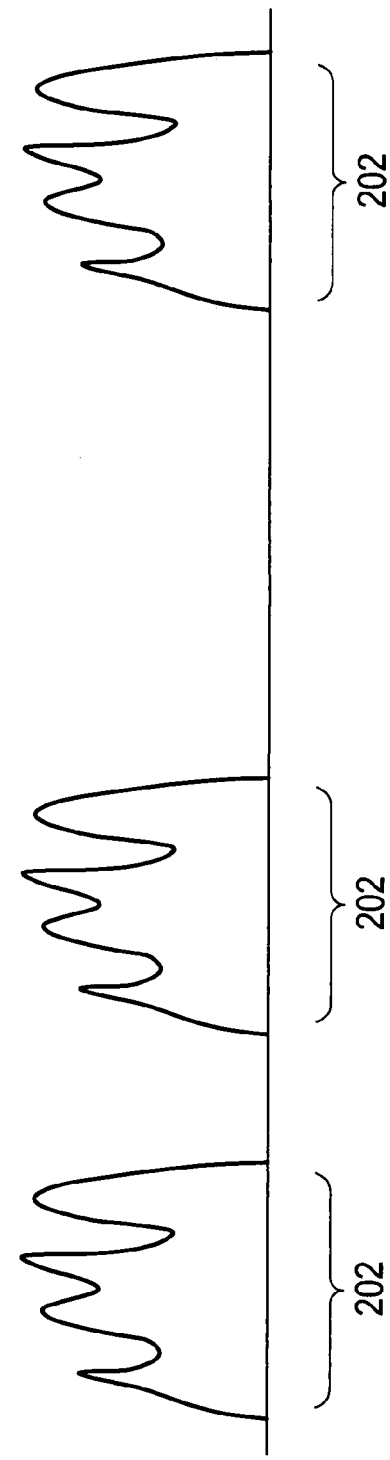

FIG. 2B is an illustration of a signal 200' transmitted in an alternative implementation. For military transmissions, low probabilities of detection, interception, and jamming are valued. To reduce the likelihood of detection and interception, the signal 200' is modulated, for example, with pseudorandom noise prior to transmission. Such modulation can be reversed upon receipt of the signal 200'. Frequency hopping can also be employed to further limit the likelihood of detection and interception of the signal 200'. For example, $f_0$ can be changed in a predetermined pattern known to receiver 108.

Figure 3:
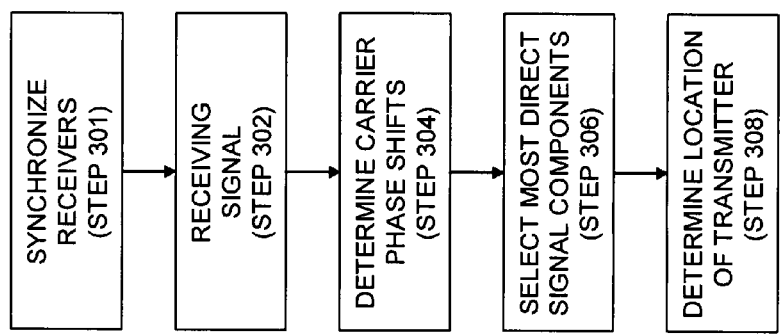
FIG. 3 is a flowchart of a method of locating a transmitter according to an illustrative embodiment of the invention.

FIG. 3 is a flowchart of an illustrative method 300 of determining the location of a transmitter 106 using MCUWB signals according to one embodiment of the invention. Referring also to FIG. 1, to analyze a signal 106, a number, K, of receivers 108 analyze the signal 106 in time windows of roughly the same length, which need not overlap in time. In one implementation, a time window is long enough to include at least one full period of the MCUWB signal. To provide for substantially equal time window lengths among the receivers 108, particularly when the receivers 108 are physically decoupled from one another, the location method 300 includes synchronizing, at least roughly, the receivers 108 (step 301). The synchronizing may include, for example, one of the K receivers 108 transmitting a beacon announcing the beginning and/or end of time windows. The beacon may be sent at the beginning of every time window or on a less frequent, periodic basis. The beacon may be sent via wire or wirelessly using RF or optical energy. The time windows may also be synchronized based on received GPS signals.

At step 302, each of the K receivers 108 receive a location signal from a transmitter 102. Assuming the transmission of only a single channel, the signal received at a given receiver 108 $s_k(t)$ can be represented by the following equation:

$$s_k(t) = \sum_{n=0}^{N-1} \sum_{m=0}^{M-1} A_{k,n,m} e^{[j2\pi(f_0 + m\Delta f)t + \Phi_{k,n,m}]},$$

where N corresponds to the number of signal components received and M corresponds to the number of carriers within a received channel. $A_{k,n,m}$ represents the amplitude of a given carrier, $f_0 + m\Delta f$ represents the frequency of carrier m, and $\Phi_{k,n,m}$ represents the phase of carrier m at the receiver 108.

To determine the distance between the receiver 108 and the transmitter 102, the receiver 108 first determines the phase shifts for each carrier in the received signal 106 (step 304). The phase, $\Phi_{k,n,m}$, can further be defined according to the following equation:

$$\Phi_{k,n,m} = -2\pi(f_0 + m\Delta f)\tau_{k,n} + \phi_m + \psi_{k,n,m}.$$

$\tau_{k,n}$ corresponds to the time delay resulting from the signal component n traveling from the transmitter 102 to the receiver 108. Time delay is related to propagation distance, d, by the speed of light, $$c, \text{ as } \tau = \frac{d}{c}.$$

$\phi_m$ corresponds to the known phase of carrier m at the time of transmission. $\psi_m$ corresponds to the phase shift of carrier m introduced by any offset $t_0$ of clocks between the transmitter 102 and the receivers 108 and is defined as:

$$\psi_m = 2\pi(f_0 + m\Delta f)t_0.$$

As a MCUWB signal propagates from a transmitter 102 to a receiver 108, the phase $\phi$ of each carrier 204 changes substantially in proportion to the distance d the signal travels before being received.

The analysis of combined received path signals is simplified by multiplying the received carrier amplitudes by the complex conjugates of the transmitted carrier signal amplitudes, $A_m * e^{-j\phi_m}$. Since the original phase $\phi_m$ of each carrier m is known, relative to other carriers, an equation for the simplified amplitude $S_m$ for a given carrier m can be represented as:

$$S_m = \sum_{n=0}^{N-1} A_{k,n} A * e^{2\pi j(-m\Delta f \tau_{k,n}) + \psi_m},$$

$$= \sum_{n=0}^{N-1} B_k e^{jm\Omega_{k,n}}, \text{ where}$$

$$B_k = A_k A * e^{j2\pi f_0 t_0} \text{ and}$$

$$\Omega_{k,n} = 2\pi \Delta f(t_0 - \tau_{k,n}) \bmod 2\pi.$$

Thus, the signal 106 received at receiver 108k, $S_m$ is treated as samples of a new signal which consists of N sinusoids, versus the sample index m. The N sinusoids have frequencies $\Omega_{k,n}$ which are related to the propagation distance of path n from the transmitter 102 to receiver 108k, and a fixed transmitter/receiver time offset, $t_0$. $\Omega_{k,n}$ may then be determined by discrete spectral analysis techniques such as those collectively known as modern spectral analysis. The $\Omega_{k,n}$ are effectively intercarrier phase shifts between received signal sinusoidal components at receiver 108k due to propagation along path n. These values correspond to samples of a complex sinusoid with respect to the Fourier frequency sampling index m. For a fixed $\Omega_k$, the phases of the carriers progressively wind about zero as a function of frequency index m. The number of windings over the range of carriers is fixed by $\Omega_k$, that is, by the total time offset, $\tau_{k0} - t_0$.

The estimation of the path selective intercarrier phase differences $\Omega_{k,n}$ as mentioned above, may be carried out by any number of discrete sinusoidal frequency or phase estimation techniques well known to those skilled in the art. A large group of techniques, collectively known as modern spectral analysis, is suited for the estimation. Classic spectral estimation techniques such as Fourier transform and Periodogram methods also may be employed given appropriate care being applied to obtain sufficiently unbiased estimates of the sinusoidal frequency content through application of data window techniques and/or sufficient spectral sampling resolution.

Of the modern spectral analysis methods, one embodiment utilizes one of several related model-based methods such as: The State Space Method of Rao and Arun, The Direct State-Space method of Kung, The Tufts and Kumaresan method, The ESPRIT method, Unitary Root-Music, Subspace-Based methods, and TLS methods. Certain implementations of these have one or more of the desirable properties of being based on robust Matrix factorization techniques such as the Singular Value Decomposition or Eigenvalue analysis, of yielding both frequency and phase estimates in a unified fashion and of working directly upon collections of sampled signal data without need for preprocessing (e.g., the computation of estimated autocorrelation functions). However, many other sinusoidal estimators may be used with various advantages and disadvantages, including, without limitation, Pade approximation methods, Hankel norm approximation methods, maximum likelihood methods, maximum entropy methods, Capon's method, forward-backward linear prediction, Prony's method and the Pisarenko approach.

The determined intercarrier phase shifts $\Omega_{k,n}$ for two receivers 108$k_1$ and 108$k_2$ are then used to determine the time difference of arrival (TDOA) of the signal at the receivers 108$k_1$ and 108$k_2$. The most-direct path signal components are selected (step 306) for use in the TDOA determination. The periodicity of the MCUWB signal can lead to a time aliasing effect, complicating the selection of a most-direct path signal component. In one embodiment the selection of the most-direct path signal component can be accomplished by selecting the strongest signal component. In another implementation, the selection can be delayed until after triangulation with various pairings of selections, with only the most suitable result being selected from among the final results. In a further implementation, the selection of the most-direct path signal component is simplified by selecting a sufficiently small $\Delta f$ and limiting the possible range of the transmitter 102. If the greatest range considered is less than $$\frac{c}{\Delta f},$$

the possibility of time aliasing can be ignored. In yet another implementation, the receiver timing offset may first be eliminated by various exchanges of signals between receivers 108 and transmitter 102, such that the estimated phase shift now corresponds directly to just the propagation delay. Other embodiments may use a combination of these and other techniques to make the appropriate selection.

The TDOA is determined by taking the difference of the intercarrier phase differences ($\Omega_{k,n} = \Delta\theta_k$) of the selected most-direct path signal components received at the two receivers 108, $k_1$ and $k_2$:

$$\theta_{k_1 k_2} = \Delta\theta_{k_1} - \Delta\theta_{k_2}.$$

By differencing the values of the intercarrier phase shifts obtained for two sites, the unknown offset $t_0$ is eliminated, resulting in the true difference of propagation delays. The TDOA of the signals 106 at receivers 108$k_1$ and 108$k_2$ is then determined as follows, $$\tau_{k_1 k_2} = \frac{-\theta_{k_1 k_2}}{2\pi \Delta f}, \text{ which equals } \frac{d_2 - d_1}{c},$$

where c is the speed of light.

After TDOA information is calculated for at least three receivers 108, one of a number of known algorithms for TDOA location estimation, including without limitation the Ho and Chan method, the Bard method, Huang's Linear Correction Least Squares Method, Smith's Spatial Interpolation Method, the Bucher method, or the Fang method, may be used to determine the location of the transmitter 102 (step 308). In one implementation, the location can be estimated with an accuracy on the order of plus or minus 10 cm.

In one embodiment, if a receiver 108 fails to receive a sufficient number of carriers within one channel to complete a TDOA analysis, the receiver 108 can analyze the phase shifts of carriers within other received channels. Therefore, if a particular transmission environment results in fading of selective frequency ranges, the use of multiple channels improves the likelihood that the receiver 108 is likely to receive a channel outside of the fading range. In still additional embodiments, the receiver analyzes information from multiple channels concurrently. For example, as part of applying the spectral analysis algorithm, a matrix is formed including the magnitudes and phases of multiple channels of the received signal components. Information for each channel is stacked in the matrix, information from one channel over information from another.

Multiple transmitters 102 can transmit signals 106 concurrently. The signals 106 can be differentiated by using multiplexing schemes known in the art, such as time division multiple access multiplexing, frequency division multiple access multiplexing, or code division multiple access multiplexing.

In additional embodiments, the MCUWB signal 106 is modulated or otherwise modified in a reversible fashion before transmission. Upon receipt, the receiver 108 reverses the modulation or modification to recover the original signal 106. For example, an outgoing transmission can be encoded using pseudo-random noise in order to disguise the signal 106 and prevent easy interception or detection of the signal. Upon receipt of the signal 106, the received signal 106 can be decoded yielding the original carrier channel formation. The decoded received signal 106 possesses the same phase delays as if the signal 106 had never been encoded at all, thereby allowing for the application of the ranging process described above.

In another implementation, the MCUWB signal 106 is modulated by the standard transmission hardware or software of a given transmission device. For example, if the MCUWB signal were to be transmitted over a walkie-talkie, the walkie-talkie would modulate the MCUWB signal to the walkie-talkie operating frequency as if the MCUWB were any other signal, such as voice. Upon receipt, the demodulated MCUWB signal can be analyzed as described before to recover phase shifts and the location of the transmitter 102.

Figure 4:
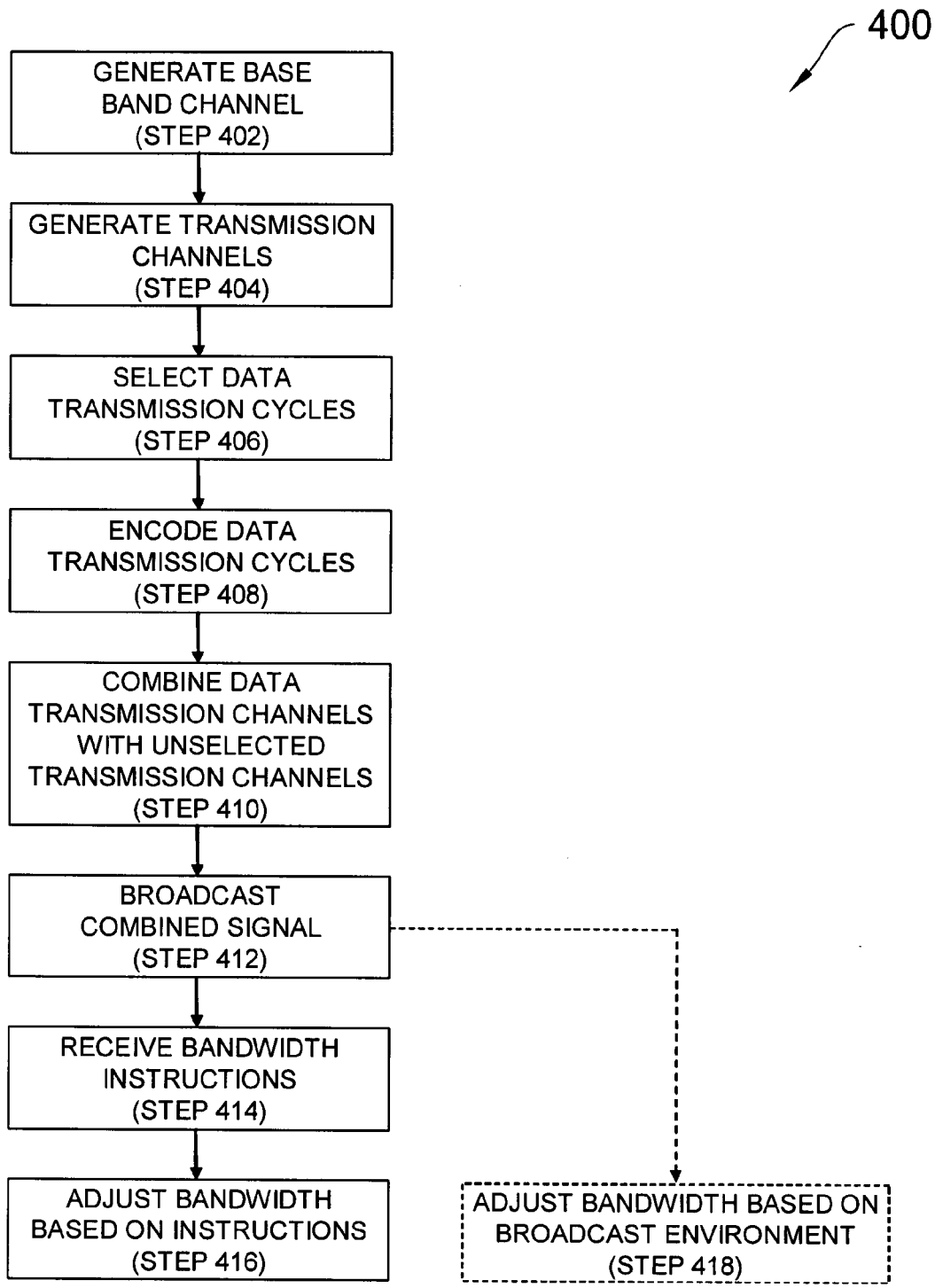
FIG. 4 is a flow chart of a method of providing variable bandwidth data communication in a locatable transmitter, according to illustrative embodiment of the invention.

FIG. 4 is a flow chart of a method 400 of providing variable bandwidth data communication in a locatable transmitter. The variable bandwidth data communication method 400 includes a locatable transmitter generating a base band signal channel (step 402). The base band signal channel includes a plurality of carriers having known relative initial phases and which are periodically spaced and orthogonal to one another. The locatable transmitter modulates the base band signal channel to a plurality of frequencies to generate a set of transmission channels (step 404). The locatable transmitter selects a subset of the transmission channels for encoding data to form data transmission channels (step 406). The locatable transmitter then encodes the data transmission channels with data (step 408). The data may include, for example, vital signs of the user of the locatable transmitter; data describing the environmental conditions in which the locatable transmitter is located, such as temperature, pressure, air quality, or gas levels; synchronization data; or any other data. The locatable transmitter combines the encoded data transmission channels with the unselected transmission channels (step 410) and broadcasts the combined signal (step 412). The unselected channels in the set of transmission channels are used by receivers to determine the location of the locatable transmitter. The locatable transmitter can also receive data communications using a similar data signal, or via any communication method known in the art.

From time to time, the receivers can communicate instructions to the locatable transmitter to adjust the number of channels the locatable transmitter uses for data communications to alter the bandwidth the locatable transmitter can use to transmit data. The locatable transmitter receives the instructions (step 414) and alters its use of the set of transmission signals accordingly (step 416). In addition to positioning instructions, the receivers can communicate other data back to the locatable transmitter, including the determined location of the transmitter. This information can then be presented to the user of the positioning device on a display screen included in the device. Alternatively, or in addition, the locatable transmitter alters the number of channels to select as data transmission channels based on the environment in which it is transmitting (step 418).

MCUWB Devices

The use of MCUWB signals can be incorporated into communication systems that provide both positioning and/or data communication services. A positioning system includes at least one locatable transmitter 102 and a plurality of receivers 108. A MCUWB communication system only needs a single receiver 108, though it may include multiple receivers 108.

Figure 5A:
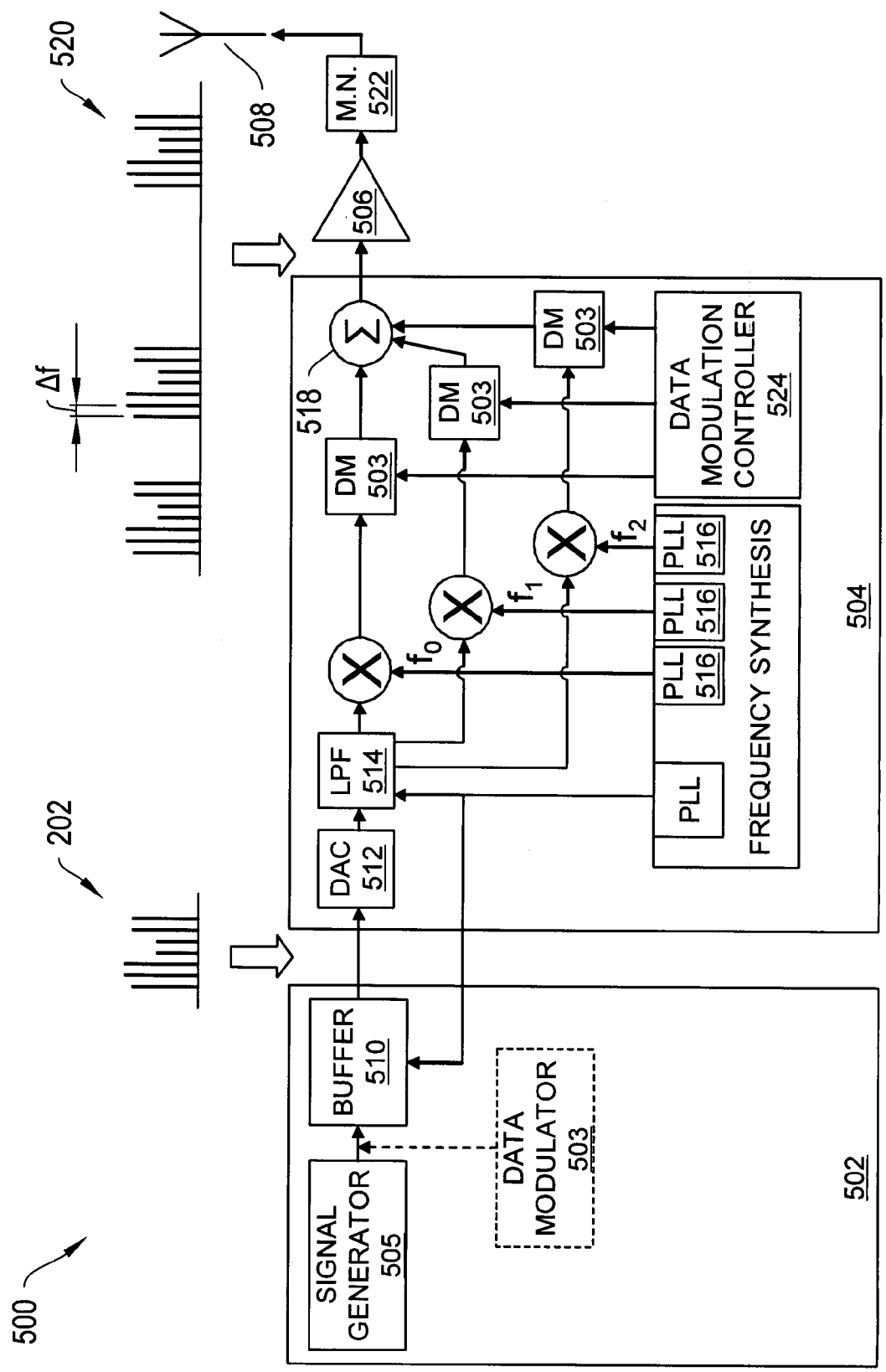
FIG. 5A is an illustrative locatable transmitter according to one embodiment of the invention.

FIG. 5A is an illustrative block diagram of a MCUWB locatable transmitter 500. A locatable transmitter 500 includes a channel generation module 502, an oscillation module 504, an amplifier 506, and an antenna 508 to transmit the signal.

In the illustrative embodiment, the channel generation module 502 is implemented in hardware, for example, a CMOS integrated circuit, a digital signal processor (DSP), an analog signal processor, or other form of integrated circuit. The channel generation module 502 includes a signal generator 505 for generating a base band channel 202 having a structure as described in relation to FIG. 2. In other embodiments, a signal structure is generated using software operating on a general purpose or specialized computing device. The channel generation module 502 generates a digital representation, in the frequency domain, of a base band channel 202 for use in a MCUWB signal, as described in FIG. 2. The channel generation module 502 then passes the frequency domain version of the base band channel through an inverse Fast Fourier Transform to generate a digital time domain version of the base band channel 202.

In one implementation the time domain version of the base band channel is stored in a signal store 510 for later transmission. In another implementation, the channel generation module 502 generates and stores a plurality of channels 202. In an alternative implementation, the base band channel 202 is generated remotely and stored permanently or semi-permanently within the channel generation module 502.

In another implementation, the channel generation module 502 includes a data modulator 503 for modulating the carriers of the base band channel to encode data, such as address data, synchronization data, or message data. One or more data modulators 503 can alternatively be located within the oscillation module 504 so that different data can be encoded into different channels. The data modulators 503 may be independently controlled by a data modulation controller 524. The data modulator 503 can use any of a variety of data modulation techniques known for Coded Orthogonal Frequency Division Multiplexing (COFDM), such as BPSK, QPSK, 16 QAM, and/or 64 QAM.

The locatable transmitter 500 may include an oscillation module 504. In one illustrative implementation, the oscillation module is implemented in a mixed signal integrated circuit that includes both digital logic and analog signal processing elements. In other implementations, the oscillation module includes software operating on a general or special purpose computer that carries out the below described signal manipulations digitally, before converting a resulting signal into an analog waveform for transmission.

The illustrative oscillation module 504 depicted in FIG. 5A, implemented in hardware, includes a digital to analog converter 512 followed by an anti-aliasing low pass filter 514. The oscillation module also includes at least one local oscillator 516 (e.g., phase lock loops, MEMS resonators, or other resonators known in the art) for replicating the base band channel 202 in various bands of the spectrum and a combiner 518 for combining the channels into the transmitted signal 520. For example one local oscillator 516 oscillates at frequency $f_0$ and a second local oscillator oscillates at frequency $f_1$.

The digital time domain version of the base band channel is passed from the channel generation module 502 to the digital to analog converter 512 of the oscillation module 504 to generate an analog base band channel signal. The analog base band channel signal is then modulated by the output of the local oscillators 516 to generate each transmission channel that will be included in the transmitted MCUWB signal. The oscillators 516 may have fixed or variable frequencies and may provide either Double Sideband or Single Sideband modulation. The output of the modulations can be directly combined to form the MCUWB signal, or individual carriers in separate transmission channels can be further modulated to encode data. The MCUWB signal 520 may have a number of transmission channels equal to the number of local oscillators used to modulate the analog base band channel. The combined signal is then passed through a power amplifier 506 and a matching network 522 to an antenna 508 through which the signal 520 can be broadcast. Elements within the transmitter 500 may share a common clock signal.

Figure 5B:
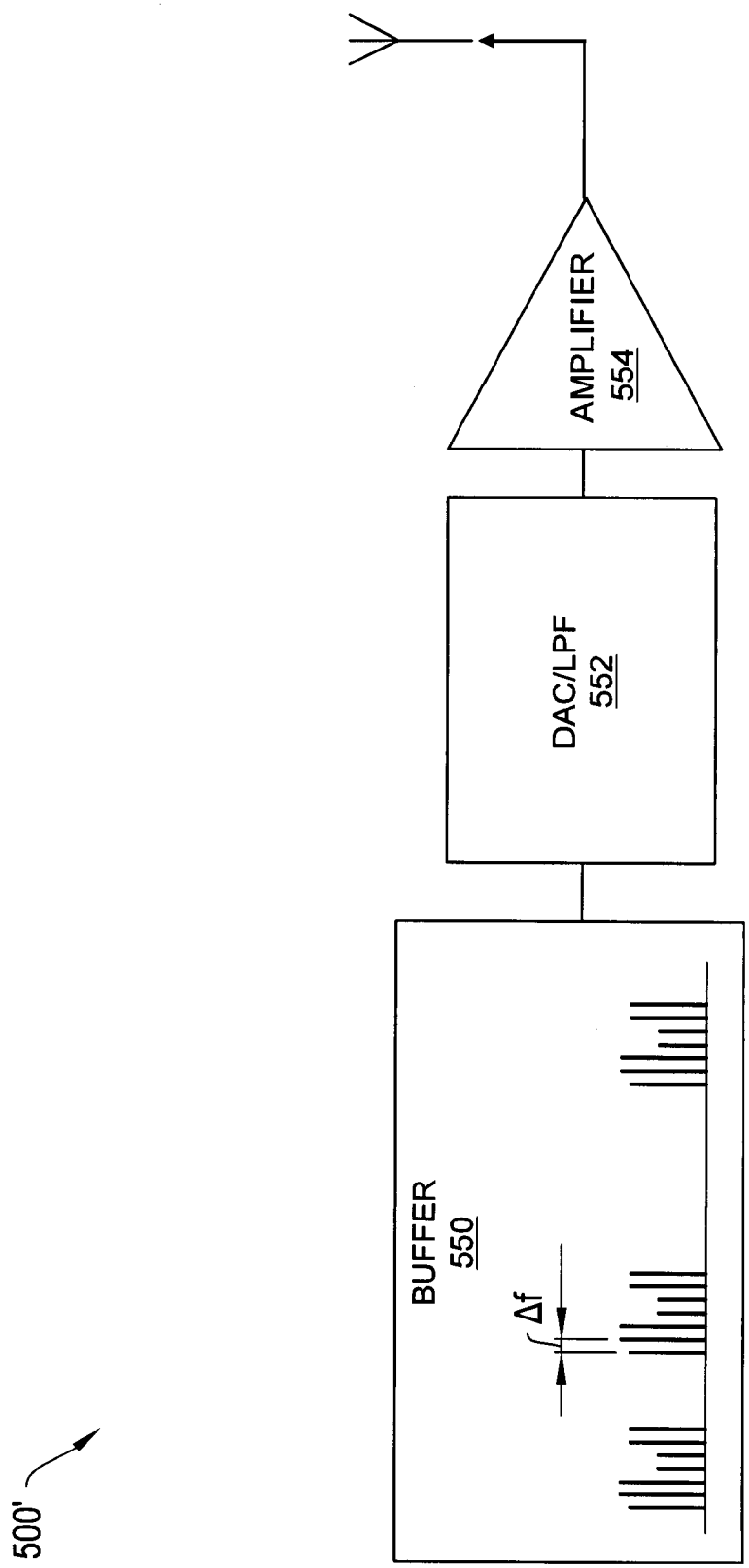
FIG. 5B is a second illustrative locatable transmitter according to one embodiment of the invention.

FIG. 5B illustrates a lower-cost implementation. Instead of having an oscillation module 502 and a channel generation module 504, the transmitter 500 includes a persistent memory 550 that stores the entire signal 520' (i.e., the linear combination of multiple channels 202) digitally, a digital to analog converter 552, and an amplifier 554 with a sufficient frequency response to amplify the signal across its spectrum. The stored signal 520' is transmitted in an endless loop.

To reduce the likelihood of detection, interception, and jamming of the MCUWB signal, the transmitter 500 can include channel hopping capabilities as described above. Implementations adopting channel hopping schemes alter the frequencies of the oscillators 516, or employ different oscillators 516 over a period of time, to modulate the base band channel 202 to varying frequencies according to a channel hopping algorithm, preferably known by the receiver 108. As a result, one would not be able to monitor only a single range of the spectrum to detect, monitor or interfere with the MCUWB signal.

In locatable transmitters 500 that allow for the transmission of data messages in addition to transmitting location information (the unmodulated sine waves), the available bandwidth for data transmission may be dynamically allocated. For example, in a system utilizing five channels, the data modulation controller 524 can select which channels are used for data transmission and which channels are used primarily for location determination. Dynamic allocation can be useful in situations where once a precise location is determined, less precise update information may suffice to monitor the location of the transmitter 500, for example, if the transmitter 500 is stationary or slow moving. Prior to the determination of the preliminary, precise location, all five channels may be utilized for location information. After the receiver 108 determines the precise location, a signal is sent to transmitter 500 to increase available data bandwidth. Thereafter, the data modulation controller 524 may select two channels for location information transmission, for example, and three channels for data transmission.

Figure 6:
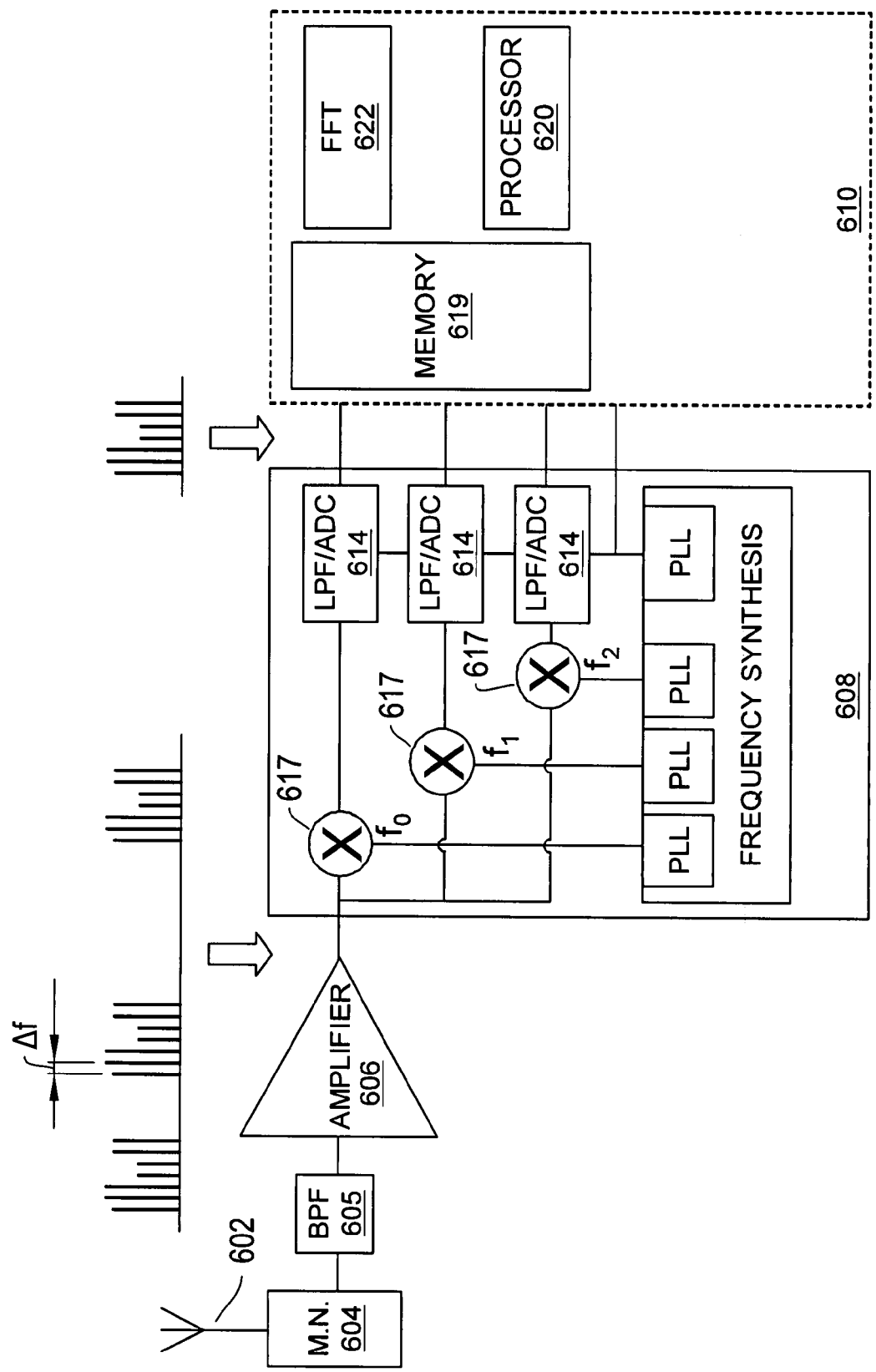
FIG. 6 is an illustrative multi-carrier ultrawideband receiver according to one embodiment of the invention.

FIG. 6 illustrates a MCUWB receiver 600 which includes an antenna 602, a matching network 604, a band-pass filter 605, one or more amplifiers 606, a demodulation module 608, and a signal analysis module 610. The antenna 602, matching network 604, and amplifier 606 can include standard, off the shelf components, though more specialized components can be used as well.

The demodulation module 604 includes a plurality of local oscillators 612 for generating signals for demodulating a received signal and a plurality of mixers 617. The oscillators may be combined into a frequency synthesizer 618. The oscillators 612 can have either fixed or variable frequencies (e.g., $f_0$, $f_1$, and $f_2$). The local oscillators 612 may provide either Single Sideband (SSB) or Double Sideband (DSB) demodulation. For DSB demodulation, the frequency of the local oscillators 612 are offset from the frequency of the oscillators used in a corresponding transmitter by at least the spectral width of the sideband to avoid loss of positioning information that can result when the frequency response of the end to end radio channel is asymmetric. Thus, if the transmitter uses a 10 MHz baseband multicarrier signal to generate a 20 MHz wide DSB transmitted waveform, centered on the transmitter's local oscillator frequency of 400 MHz, then, the receiver local oscillator 612 would be offset by at least 10 MHz (to about 390 MHz or 410 MHz).

In one implementation, the channels of the received signal are separated out from the received signal using splitters and additional bandpass filters prior to the demodulation of the components of the signal. The resulting demodulated signals are then filtered using low pass filters 614, digitized, and stored. Each digitized demodulated signal can then be analyzed by the signal analysis module 610. In other implementations, the received signal is digitized prior to splitting or demodulation. The digitized signal is then manipulated digitally.

In implementations in which all channels are substantially identical other than their frequency position along the spectrum, the signal resulting from the demodulating of each channel corresponds to the original base-band channel, though each carrier is shifted from its original phase. In other implementations, each demodulated channels may carry one or more data messages, including synchronization data and other data traffic. While the receiver 108 can utilize synchronization data, synchronization data is not necessary for accurate ranging.

The signal analysis module 610 can be implemented as software operating on a general purpose or special purpose computing device, or as hardware in the form of a reprogrammable logic device, a DSP, an ASP, or other form of integrated circuit, or as a combination, thereof. The signal analysis module 610 is configured to carryout the method 300 described above with respect to FIG. 3. In one implementation, the signal analysis module 610 includes a memory 619 for storing the demodulated signals for analysis by a processor 620. The processor may include specialized FFT hardware 622 for carrying out Fast Fourier Transforms. The processor 620 may also be configured to recover data modulated into one or more of the received demodulated signals.

In one specific implementation of a receiver 600 for handling a single channel signal, the antenna 602 is a unity gain antenna with a wide bandwidth from 400 MHz to 512 MHz. The RF bandpass filter (BPF) 605 used is a tubular filter with a sharp roll off at the 3 dB cutoff frequencies. The BPF 605 is designed with a low insertion loss of 1.65 dB (max) at the passband center and has a 3 dB bandwidth of 50 MHz centered at 440 MHz. The 40 dB bandwidth is 120 MHz with 40 dB attenuation at 380 MHz on the lower side and 500 MHz on the upper side. Thus, the current receiver setup allows the system to operate on an OFDM signal as wide as 50 MHz. The low noise amplifier (LNA) 606 follows the BPF 605. The LNA 606 has a high gain of 22.5 dB and a low noise figure of 1.6 dB (max). The typical IIP3 value for the LNA 606 is −5.5 dBm and the maximum input RF level is 10 dBm. A wideband variable gain amplifier (VGA) follows the LNA 606 and has a gain variation range of 15.5 dB, a high input intercept point of 15.5 dBm and is capable of receiving a maximum RF input power of 12 dBm. The oscillation module 608 includes a high performance active mixer 617 used as a direct down-converter. The required local oscillator signal to drive the mixers 617 should be between −12 dBm and −3 dBm. An RF PLL frequency synthesizer 618 provides the mixer 617 with the required local oscillator signal. The crystal oscillator used in the PLL synthesizer 618 is a 10 MHz TCXO and has a frequency stability of 2.5 ppm. The VCO used in the PLL circuit has a frequency range of 415 MHz to 475 MHz, a tuning sensitivity of 10 MHz/V and an output phase noise of −136 dBc/Hz. The $2^{nd}$ and $3^{rd}$ harmonic suppressions at the VCO output are −18 dBm and −20 dBm, respectively. A nine-section, Chebychev lowpass filter 614 follows the mixer. This lowpass filter 614 is designed with a very sharp cut off and a very low insertion loss of 0.5 dB (max). The filter has a cutoff frequency of 50 MHz and 50 dB attenuation occurs at 65 MHz. The sharp cutoff makes this filter good for harmonic suppression. A laptop computer serves as the signal analysis module 610. Elements within the receiver 600 may share a common clock signal.

The invention may be embodied in other specific forms without departing from the spirit or essential characteristics thereof. The forgoing embodiments are therefore to be considered in all respects illustrative, rather than limiting of the invention.

What is claimed is:

1. A method of signal analysis, comprising:
receiving, by at least three receivers, from a transmitter physically decoupled from at least one of the three receivers, a plurality of signal components corresponding to a first continuous-time signal having a first channel including a first plurality of carriers having known relative initial phases and having known frequencies which are orthogonal to one another within a first frequency range;
determining, for at least one of the plurality of signal components, the phase shifts of the carriers of the first channel resulting from the distance the carriers traveled in reaching the receivers; and
determining the location of the transmitter based on the determined carrier phase shifts.

2. The method of claim 1, wherein the frequencies of the carriers in the first channel are periodically spaced.

3. The method of claim 1, wherein the location determination includes determining the time difference of arrival of the signals at the receivers.

4. The method of claim 1, wherein the first continuous-time signal further comprises additional channels, the additional channels including a plurality of carriers having known relative initial phases and having known frequencies that are periodically spaced and orthogonal to one another within distinct frequency ranges.

5. The method of claim 4, comprising determining phase shifts of the plurality of carriers in the additional channels, and wherein the location is determined based on the determined phase shifts of at least two channels of the first continuous-time signal.

6. The method of claim 4, wherein the frequencies of the channels are selected to lie between frequency ranges restricted by the government for other uses.

7. The method of claim 1, wherein the carriers comprise unmodulated sine waves.

8. The method of claim 1, comprising identifying, based at least in part on the determined phase shifts, a most-direct path signal component arriving at one of the receivers by a most-direct path, and wherein the location determination is based upon analysis of the most-direct path signal component.

9. The method of claim 1, wherein the location determination includes determining, based at least in part on evaluating a plurality of potential location solutions, a most-direct path signal component arriving at one of the receivers by a most-direct path.

10. The method of claim 1, further comprising synchronizing the at least three receivers.

11. The method of claim 1, comprising determining a time delay by applying an algorithm from a class of a modern spectral analysis algorithms to the determined phase shifts.

12. The method of claim 11, wherein the algorithm is a state space algorithm.

13. The method of claim 12, wherein the state space algorithm includes forming a matrix including the magnitudes and phases of the first plurality of carriers and performing a plurality of matrix decompositions upon the matrix.

14. The method of claim 1, comprising decoding the first-continuous time signal using a predetermined decoding key corresponding to a coding scheme applied by the transmitter.

15. The method of claim 14, wherein the decoding key comprises a pseudo-random noise pattern.

16. The method of claim 1, comprising transmitting the determined transmitter location to the transmitter.

17. A transmitter location system comprising:
- a first receiver having a first location for receiving a plurality of signal components to a continuous-time signal, sent by a transmitter, the signal having at least one channel, the channel comprising a plurality of carriers having known relative initial phases and having frequencies which are orthogonal to other frequencies within that channel;
- second and third receivers having a second and third locations known relative to the first location for receiving the continuous-time signals; and
- a processor configured to:
  - for each receiver, determine the differences in phase shifts in the carriers of at least one of the channels of the signal components;
  - for each receiver, selecting one of the plurality of signal component as a most-direct path signal component based on the determined phase shifts; and
  - determine the location of the transmitter based on the determined phase shifts and the relative receiver locations.

18. The transmitter location system of claim 17, wherein the frequencies of the carriers in the at least one channel are spaced periodically over a distinct frequency range.

19. The transmitter location system of claim 17, wherein the transmitter broadcasts the channels at frequencies selected to be between frequency ranges restricted by the government for other uses.

20. The transmitter location system of claim 17, wherein the carrier frequencies comprise unmodulated sine waves.

21. The transmitter location system of claim 17, wherein the processor determines a time delay by applying an algorithm from a class of a modern spectral analysis algorithms to the determined phase shifts.

22. The transmitter location system of claim 21, wherein the modern spectral analysis algorithm applied by the processor is a state space algorithm.

23. The transmitter location system of claim 22, wherein the processor is configured to form a matrix including the magnitudes and phases of the plurality of carriers of one of the analyzed channels and to perform a plurality of matrix decompositions upon the matrix using the state space algorithm.

24. The transmitter location system of claim 22, wherein the processor is configured to form a matrix including the magnitudes and phases of the plurality of carriers of at least two of the analyzed channels and to perform a plurality of matrix decompositions upon the matrix using the state space algorithm.

25. The transmitter location system of claim 17, wherein the processor is further configured to decode at least one of the continuous-time signals using a known decoding key corresponding to a coding scheme applied by the transmitter.

26. The transmitter location system of claim 25, wherein the coding scheme comprises modulating the channel with pseudo random noise.

27. The transmitter location system of 17, including a locatable transmitter comprising:
- a signal store for storing a signal channel, the channel comprising a plurality of carriers having known relative initial phases and having frequencies which are orthogonal to other frequencies within that channel and which are spaced periodically over a distinct frequency range; and
- an amplifier in communication with the store for transmitting a signal.

28. The transmitter location system of claim 27, wherein the signal store stores a plurality of signal channels.

29. The transmitter location system of claim 27, wherein the locatable transmitter further comprises an oscillator in communication with the signal store and an amplifier for modulating the stored signal channel to a base band frequency.

30. The transmitter location system of claim 27, wherein the oscillator is configured to oscillate at multiple frequencies thereby providing for frequency hopping.

31. A locatable transmitter comprising:
- a signal store for storing a signal channel, the channel comprising a plurality of carriers having known relative initial phases and having frequencies which are orthogonal to other frequencies within that channel;
- a first oscillator in communication with the signal store for modulating the signal channel at a first base band frequency to generate a first transmission channel;
- a second oscillator in communication with the signal store for modulating the signal channel at a second base band frequency to generate a second transmission channel; and
- an amplifier in communication with the first and second oscillators for broadcasting a location signal including the linear combination of the first and second transmission channels.

32. The locatable transmitter of claim 31, wherein the frequencies of the carriers in the signal channel are spaced periodically over a distinct frequency range.

33. The locatable transmitter of claim 31, further including an encoder in communication with the amplifier for encoding the broadcast signal with a predetermined code prior to transmission of the location signal.

34. The locatable transmitter of claim 33, wherein the predetermined code comprises a pseudo-random noise pattern.

35. The locatable transmitter of claim 31, wherein the frequencies of the first and second oscillators are variable and are controlled to provide for frequency hopping.

36. A communications device comprising:
- a base band signal generator for generating a base band signal including a first plurality of carriers having known relative initial phases and having known frequencies which are orthogonal to one another within a first frequency range;
- an oscillation module in communication with the base band signal generator for modulating the base band signal to generate a set of transmission channels;
- a data modulation controller configured to select a subset of the transmission channels as data transmission channels; and
- a data modulator for modulating data into the data transmission channels, wherein the unselected channels can be analyzed by a receiver to determine the location of the communications device.

37. The communications device of claim 36, wherein the frequencies of the carriers are periodically spaced with the first frequency range.

38. The communications device of claim 36, wherein the data modulator is configured to modulate each of the selected channels independently with data.

39. The communications device of claim 36, wherein the data modulation controller is configured to dynamically select a number of transmission channels as data transmission channels, based at least in part on instructions received from a receiver.

40. The communications device of claim 36, wherein the data modulation controller is configured to dynamically select a number of transmission channels as data transmission channels, based at least on the environment that the communications device is broadcasting in.

41. The communications device of claim 36, wherein the data modulator is configured to modulate a data transmission channel with at least one of user vital sign data and environmental data.

42. The communications device of claim 36, wherein the data modulator is configured to modulate a data transmission channel with synchronization data.

43. A communications device comprising:
   a demodulation module for demodulating a plurality of signal channels of a plurality of received signal components, each channel including a plurality of carriers having known relative initial phases and having known frequencies which are orthogonal to one another within a distinct frequency range;
   a signal analysis module configured to
      determine a most-direct path signal component from the plurality of received signal components sent by a transmitter to the communications device;
      determine the distance between the communications device and the transmitter; and
      recover data modulated into at least one of the received channels;
      provide requested data bandwidth instructions to the receiver.

44. The communications device of claim 43, wherein the frequencies of the carriers within each channel are periodically spaced within their corresponding distinct frequency ranges.

45. The method of claim 43, wherein the signal analysis module is configured to determine a location of the transmitter based on the determined distance.

46. The method of claim 45, wherein the signal analysis module is configured to transmit the determined transmitter location to the transmitter.

47. A method of providing variable bandwidth data communication comprising:
   generating a base band channel including a plurality of carriers having known relative initial phases and having known frequencies which are orthogonal to one another within a frequency range;
   modulating the base band channel to a plurality of base frequencies to generate a set of transmission channels;
   selecting a subset of the transmission channels for encoding data to form data transmission channels;
   combining and broadcasting the selected and unselected transmission channels, wherein the unselected transmission channels can be analyzed by a receiver to determine the location of the source of the broadcast.

48. The method of claim 47, wherein the frequencies of the base band channel are periodically spaced within the frequency range.

49. The method of claim 47, wherein each of the selected channels is independently modulated with data.

50. The method of claim 47, further comprising dynamically determining the number of transmission channels to be selected as data transmission channels, based at least in part on instructions received from the receiver.

51. The method of claim 47, further comprising dynamically determining the number of transmission channels to be selected as data transmission channels, based at least on the broadcast environment.

52. The method of claim 47, wherein the data includes at least one of user vital signs and environmental data.

53. The method of claim 47, wherein the data includes synchronization data.

* * * * *